US012275165B2

(12) United States Patent
Kim

(10) Patent No.: US 12,275,165 B2
(45) Date of Patent: Apr. 15, 2025

(54) WORKPLATE FOR Y-AXIS COMPENSATION OF INGOT AND Y-AXIS COMPENSATION METHOD OF INGOT USING THE SAME

(71) Applicant: SK Siltron Co., LTD., Gyeongsangbuk-do (KR)

(72) Inventor: Ah Reum Kim, Gyeongsangbuk-do (KR)

(73) Assignee: SK SILTRON CO., LTD., Gyeongsangbuk-Do (KR)

( * ) Notice: Subject to any disclaimer, the term of this patent is extended or adjusted under 35 U.S.C. 154(b) by 543 days.

(21) Appl. No.: 17/679,285

(22) Filed: Feb. 24, 2022

(65) Prior Publication Data

US 2023/0219258 A1 Jul. 13, 2023

(30) Foreign Application Priority Data

Jan. 10, 2022 (KR) ........................ 10-2022-0003268

(51) Int. Cl.

*B28D 7/04* (2006.01)
*B28D 5/00* (2006.01)
*B28D 5/04* (2006.01)

(52) U.S. Cl.

CPC ............. *B28D 7/04* (2013.01); *B28D 5/0082* (2013.01); *B28D 5/0088* (2013.01); *B28D 5/045* (2013.01)

(58) Field of Classification Search

CPC ........ B28D 7/04; B28D 5/0082; B28D 5/045; B28D 5/00; B28D 5/0064; B26D 7/01
USPC ...................................................... 269/289 R
See application file for complete search history.

(56) References Cited

U.S. PATENT DOCUMENTS

| | | | | |
|---|---|---|---|---|
| 5,797,307 A | 8/1998 | Horton | | |
| 2015/0230887 A1* | 8/2015 | Damon | ................. | A61C 7/146 433/9 |
| 2018/0215075 A1 | 8/2018 | Watanabe | | |

FOREIGN PATENT DOCUMENTS

| | | | | |
|---|---|---|---|---|
| CN | 106079121 A | * 11/2016 | | |
| CN | 207803650 | 9/2018 | | |
| CN | 115478325 A | * 12/2022 | ............... | B28D 7/00 |
| JP | H08309737 | * 11/1996 | | |
| JP | H10-044143 | 2/1998 | | |

(Continued)

OTHER PUBLICATIONS

Korean Office Action dated Nov. 22, 2023 issued in Application No. 10-2022-0003268.

(Continued)

*Primary Examiner* — Mahdi H Nejad
(74) *Attorney, Agent, or Firm* — KED & ASSOCIATES, LLP

(57) ABSTRACT

Disclosed is a workplate for Y-axis compensation of an ingot and a Y-axis compensation method of the ingot using the same, which is configured to facilitate Y-axis compensation of the ingot in a state in which the ingot is attached to the workplate at a cutting-plane angle so as to be cut using a wire-cutting apparatus. More particularly, the workplate includes a bottom plate, having an upper surface formed to be curved downwards with respect to a longitudinal direction of the ingot attached to the workplate, and a top plate, coupled to the bottom plate such that a lower surface thereof is movable along the upper surface of the bottom plate and configured to enable the ingot to be coupled to an upper portion thereof at an X-axis cutting-plane angle.

5 Claims, 8 Drawing Sheets

(56) References Cited

FOREIGN PATENT DOCUMENTS

| | | | | | |
|---|---|---|---|---|---|
| JP | H10-182299 | | | 7/1998 | |
| JP | H10-337695 | | | 12/1998 | |
| JP | H11-262917 | | | 9/1999 | |
| JP | 2003042154 | A | * | 2/2003 | .............. F16C 29/02 |
| JP | 2012183615 | A | * | 9/2012 | ........... B28D 5/0064 |
| KR | 10-2007-0063833 | | | 6/2007 | |
| KR | 2007063833 | A | * | 6/2007 | ....... H01L 21/02002 |
| KR | 10-0887494 | | | 3/2009 | |
| KR | 100887494 | B1 | * | 3/2009 | |
| KR | 20130011533 | A | * | 1/2013 | |
| KR | 10-1263132 | | | 5/2013 | |
| KR | 10-1467691 | | | 12/2014 | |
| KR | 10-2018-0036702 | | | 4/2018 | |
| TW | 201102243 | | | 1/2011 | |

OTHER PUBLICATIONS

Japanese Office Action dated Jan. 18, 2023 issued in JP Application No. 2022-026582.
Taiwanese Office Action dated Nov. 2, 2022 issued in Application No. 111107116.

* cited by examiner

WORKPLATE FOR Y-AXIS COMPENSATION OF INGOT AND Y-AXIS COMPENSATION METHOD OF INGOT USING THE SAME

CROSS-REFERENCE TO RELATED PATENT APPLICATIONS

This application claims the benefit of Korean Patent Application No. 10-2022-0003268, filed on Jan. 10, 2022, which is hereby incorporated by reference as if fully set forth herein.

BACKGROUND OF THE INVENTION

Field of the Invention

The present invention relates to a workplate for Y-axis compensation of an ingot and a Y-axis compensation method of an ingot using the same, and more particularly to a workplate for Y-axis compensation of an ingot and a Y-axis compensation method of an ingot using the same configured to facilitate Y-axis compensation of an ingot.

Discussion of the Related Art

Generally, crystallographic orientation of a silicon wafer is not distinguishable by the naked eye. For this reason, a portion of an edge of the wafer is cut flat in order to indicate the orientation thereof. The portion that is cut flat is called a flat zone (hereinafter simply referred to as a "flat"), and the number and arrangement of flats varies depending on the type of wafer. In addition, such a flat is formed in a manner such that the orientation of the flat in an ingot is detected before forming a wafer (before slicing the ingot), after which the ingot is cut in the longitudinal direction of the ingot. The orientation of the flat reflects the particular crystallographic orientation of the ingot, and is usually detected using an X-ray goniometer of an X-ray diffractometer.

Korean Patent Registration No. 10-1263132 discloses an apparatus for detecting the orientation of an ingot, the apparatus being capable of performing a cutting preparation process using only a goniometer in a conventional cutting preparation process for a silicon ingot, which conventionally requires a large amount of equipment. Korean Patent Registration No. 10-1467691 discloses an apparatus for detecting the orientation of an ingot configured to adjust the distance between a fixed roller and a moving roller by rotating a stopper.

FIG. 1 is a conceptual view illustrating a conventional method of compensating ingot orientation. In the conventional orientation compensation method, an ingot 10 is rotated so as to set a Y value (vertical) to '0', and then the ingot 10 is moved to the left or right so as to change an X value (horizontal) to match a target. Here, when the X value matches the target, orientation compensation is completed, and a wire sawing process is performed.

However, in the conventional compensation method, the Y value (vertical) must be fixed to '0', and a notch angle is formed in an arbitrary direction, which is different for each ingot 10.

Recently, need has arisen to compensate the X value and the Y value in the state in which the orientation of the notch angle is fixed.

RELATED ART DOCUMENTS

Patent Documents (0001) Korean Patent Registration No. 10-1467691
(0002) Korean Patent Registration No. 10-1263132

SUMMARY OF THE INVENTION

Accordingly, the present invention is directed to a workplate for Y-axis compensation of an ingot and a Y-axis compensation method of an ingot using the same that substantially obviate one or more problems due to limitations and disadvantages of the related art.

An object of the present invention is to provide a workplate for Y-axis compensation of an ingot and a Y-axis compensation method of an ingot using the same, configured to fix a notch orientation and to enable Y-axis compensation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, disclosed is a workplate for Y-axis compensation of an ingot, the ingot attached thereto at a cutting-plane angle so as to be cut using a wire-cutting apparatus, the workplate including a bottom plate having an upper surface formed to be curved downwards with respect to a longitudinal direction of the ingot attached to the workplate, and a top plate, coupled to the bottom plate such that a lower surface thereof is movable along the upper surface of the bottom plate and configured to enable the ingot to be coupled to an upper portion thereof at an X-axis cutting-plane angle.

The bottom plate may be formed, at an upper portion thereof, with a movement guide configured to guide the top plate to move along the curved upper surface of the bottom plate in the longitudinal direction of the bottom plate without being separated from the bottom plate.

The movement guide may be formed to be narrower in width than the upper surface of the bottom plate, and may protrude upwards with respect to the longitudinal direction of the ingot attached to the workplate. Here, the movement guide may have opposite side surfaces inclined from inside to outside.

The top plate may be formed, at a lower portion thereof, with a movement guide coupler coupled to the movement guide so as to allow the top plate to move along the movement guide.

The top plate, which moves along the curved upper surface of the bottom plate while contacting the same, may be formed with bent portions at opposite side surfaces thereof, respectively. Here, the lower surfaces of the bent portions may have a shape corresponding to the shape of the curved upper surface of the bottom plate, and the inner side surfaces of the bent portions may be formed to be inclined from outside to inside while extending downwards such that the inner side surfaces has a shape corresponding to the shape of the opposite side surfaces of the movement guide.

The top plate may be moved by the operation of a linear movement device configured to press each of longitudinal opposite ends of the top plate in a horizontal direction, and an interference-preventing groove may be formed in the upper portion of the bottom plate along the movement trajectory of the linear movement device so that a pressing portion of the linear movement device does not come into contact with the bottom plate when one of the opposite ends of the top plate is pressed by the linear movement device.

The workplate may further include a fixing and releasing unit, configured to fix the top plate to the bottom plate or to release fixation between the top plate and the bottom plate.

The fixing and releasing unit may include a plurality of fastening holes formed in the side surface of the top plate, and fixing bolts respectively fastened into the fastening holes so as to press the upper side surface of the bottom plate, thereby fixing the top plate to the bottom plate.

The ingot may be coupled to the top plate in the state in which the orientation of the notch in the ingot is fixed.

In another aspect of the present invention, a Y-axis compensation method of an ingot using the workplate described above is provided. Here, the method includes a step of matching an X-axis target, carried out such that the ingot is moved leftwards and rightwards on the top plate so as to match an X value (horizontal) target, a step of coupling the ingot, carried out such that the ingot, the X value of which is adjusted, is attached to the top plate, and a step of matching a Y-axis target, carried out such that the top plate is moved along the curved upper surface of the bottom plate so as to match a Y value (vertical) target after the step of coupling the ingot.

The method may further include a step of releasing the top plate, carried out such that fixation between the top plate and the bottom plate is released using a fixing and releasing unit after the step of coupling the ingot, and a step of fixing the top plate, carried out such that the top plate is fixed to the bottom plate using the fixing and releasing unit after the step of matching the Y-axis target.

The method may further include a step of adjusting notch orientation, carried out such that the orientation of the notch in the ingot is fixed to a set orientation before the step of matching the X-axis target.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
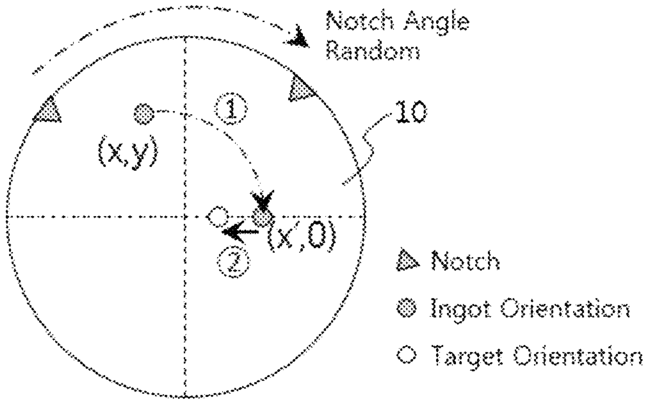
FIG. 1 is a conceptual view illustrating a conventional method of compensating ingot orientation.

Hereinafter, embodiments of the present invention will be described in detail with reference to the accompanying drawings.

In the drawings, sizes are exaggerated, omitted, or schematically illustrated for convenience and clarity of description. In addition, the size of each component does not fully reflect the actual size thereof. Also, like reference numerals denote like elements throughout the description of the drawings.

Figure 2:
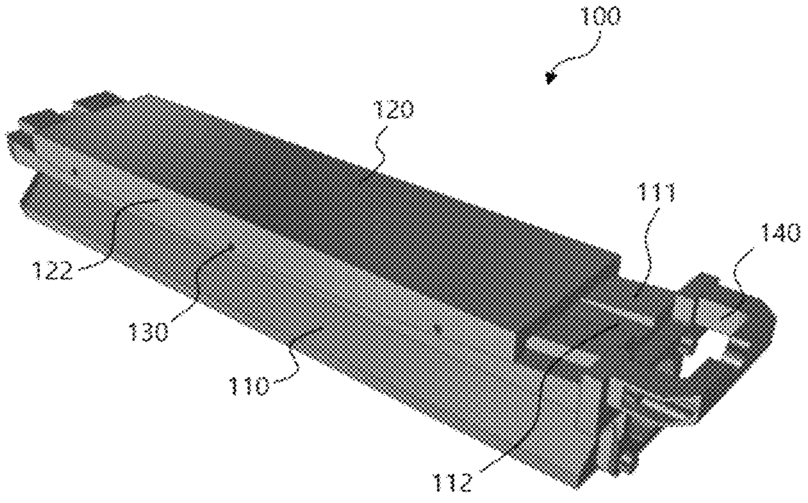
FIG. 2 is a perspective view according to an embodiment of a workplate for Y-axis compensation of an ingot of the present invention.
Figure 3:
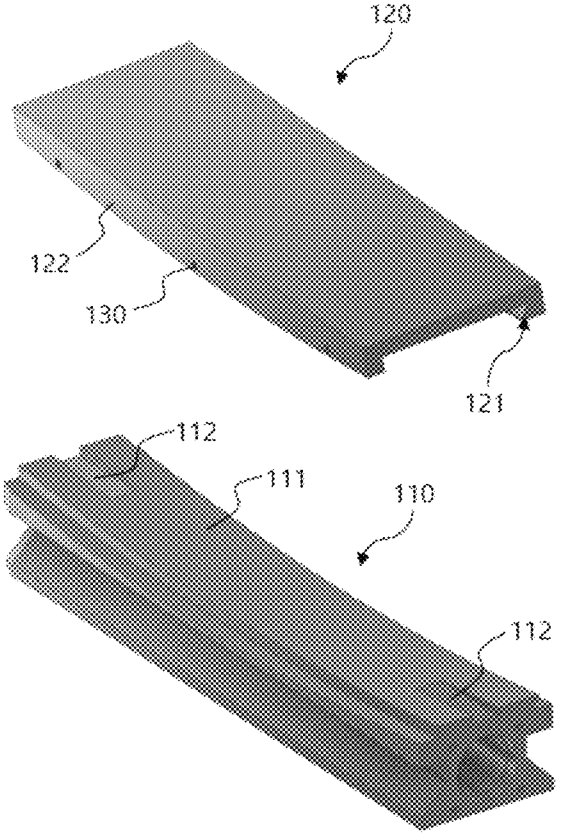
FIG. 3 is an exploded perspective view of the main portion of the workplate for Y-axis compensation of an ingot of the present invention.
Figure 4:
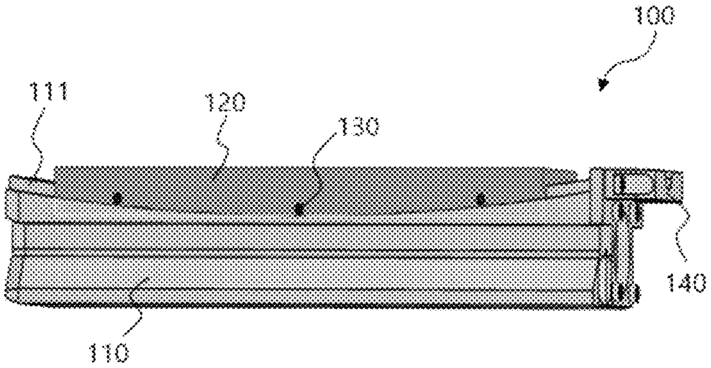
FIG. 4 is a front view illustrating the workplate for Y-axis compensation of an ingot of the present invention, which is divided into a bottom plate and a top plate.
Figure 5:
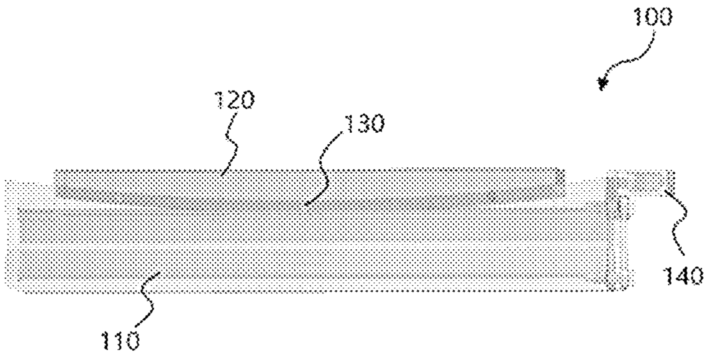
FIG. 5 is a perspective view illustrating the state in which the bottom plate and the top plate of FIG. 4 are coupled.
Figure 6:
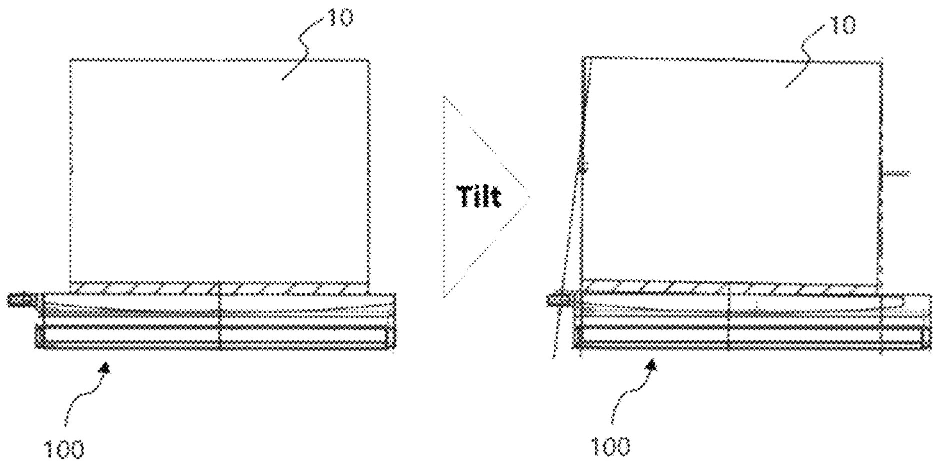
FIG. 6 is a view illustrating the state in which an ingot, which is attached using the workplate for Y-axis compensation of the ingot of the present invention, is tilted by Y-axis compensation of the ingot.

FIG. 2 is a perspective view according to an embodiment of a workplate for Y-axis compensation of an ingot of the present invention, FIG. 3 is an exploded perspective view of the main portion of the workplate for Y-axis compensation of an ingot of the present invention, FIG. 4 is a front view illustrating the workplate for Y-axis compensation of an ingot of the present invention, which is divided into a bottom plate and a top plate, FIG. 5 is a perspective view illustrating the state in which the bottom plate and the top plate of FIG. 4 are coupled, and FIG. 6 is a view illustrating the state in which an ingot, which is attached using the workplate for Y-axis compensation of the ingot of the present invention, is tilted by the Y-axis compensation of the ingot.

With reference to FIGS. 2 to 6, the structure of the workplate for Y-axis compensation of an ingot of the present invention will be described below.

A workplate may be understood as a kind of jig configured for an ingot to be placed thereon so as to cut the ingot using a cutting apparatus (a wire saw). The workplate for Y-axis compensation of an ingot of the present invention (hereinafter referred to as a workplate 100) is configured to attach and fix thereto an ingot 10 at a cutting-plane angle so as to cut the ingot using a wire-cutting apparatus (not illustrated). The workplate may include a bottom plate 110 and a top plate 120.

The bottom plate 110 is a lower part of the workplate 100, and is designed to be fixed to a work table. The shape of the lower portion of the bottom plate 110 may vary depending on the structure and shape of the work table.

The upper portion of the bottom plate 110 is curved at a set curvature with respect to the longitudinal direction of the ingot 10 attached to the workplate 100. The curvature may be set in consideration of a Y-axis adjustment angle of the ingot 10.

The top plate 120 is movably coupled to the upper surface of the bottom plate 110, which is curved at the set curvature as described above. To this end, the lower surface of the top plate 120 has the same curvature as the set curvature so as to correspond to the upper surface of the bottom plate 110, and is curved downwards. The upper surface of the top plate 120 is flat, and the ingot 10 is attached and fixed thereto at an X-axis cutting-plane angle. Here, the plate is made of a calcium carbonate material, and is bonded to attach the ingot 10 thereto. Since the X-axis adjustment and bonding attachment method of the ingot 10 are known techniques, a detailed description thereof will be omitted. However, in the related art, since only the Y-axis of the ingot 10 is fixed to zero, the orientation of a notch formed in the ingot 10 varies in the process of rotating the ingot 10, whereas, according to the present invention, the ingot 10 may be attached and fixed to the upper surface of the top plate 120 in the state in which the notch angle is adjusted to a desired angle.

Meanwhile, a movement guide 111 is formed on the upper portion of the bottom plate 110. The movement guide 111 allows the top plate 120 to move along the curved upper surface of the bottom plate 110 without being separated from the bottom plate 110. The movement guide 111 may be manufactured in any of various known shapes, as long as the top plate 120 is capable of being moved to the left and right while being supported by the bottom plate 110. For example, the movement guide 111 may be formed to be narrower in width than the upper surface of the bottom plate 110, and may protrude upwards with respect to the longitudinal direction of the ingot attached to the workplate 100. Here, the movement guide 111 may have opposite side surfaces inclined from inside to outside.

The top plate 120 may be formed, at the lower portion thereof, with a movement guide coupler 121 corresponding to and coupled to the movement guide 111. For example, the top plate 120, which moves along the curved upper surface of the bottom plate 110 while contacting the same, may be formed with bent portions 122 at opposite side surfaces thereof, respectively. Here, the lower surfaces of the bent portions 122 may have a shape corresponding to the shape of the curved upper surface of the bottom plate 110, and the inner side surfaces of the bent portions 122 may be formed to be inclined from outside to inside while extending downwards such that the inner side surfaces have a shape corresponding to the shape of the opposite side surfaces of the movement guide 111. In other words, the bent portions 122 of the top plate 120 may be coupled to the opposite side surfaces of the movement guide 111 of the bottom plate 110, respectively, so as to slide in the forward-rearward direction (the left-right direction in FIGS. 4 and 5) along the curved surface without being separated upwards.

Meanwhile, a fixing and releasing unit 130 may be further provided so as to fix the top plate 120, which moves leftwards and rightwards (refer to the left-right direction in FIGS. 4 and 5) along the upper surface of the bottom plate 110, to the bottom plate 110 or to release the fixation between the top plate 120 and the bottom plate 110.

As long as the fixing and releasing unit 130 has a structure capable of fixing the top plate 120 to the bottom plate 110 and releasing the same therefrom, various known techniques may be applied in the fixing and releasing unit 130. As an example, the fixing and releasing unit 130 may include a fastening hole (reference numeral not shown) and a fixing bolt (reference numeral not shown). The fastening hole may be formed in either of the opposite side surfaces of the top plate 120, and may be provided in a plural number. As illustrated, the fastening hole (reference numeral not shown) may be formed in the bent portion 122 of the top plate 120, and three fastening holes may be provided. The fixing bolt (reference numeral not shown) may be inserted into the fastening hole and press the upper side surface of the bottom plate 110, thereby firmly fixing the top plate 120 to the bottom plate 110.

The top plate 120 constructed as described above may be moved along the upper portion of the bottom plate 110 using a linear movement device (not illustrated). The linear movement device may be, for example, a pressing rod (not illustrated) that is moved forwards and rearwards in the horizontal direction by a servomotor.

In other words, based on FIGS. 4 and 5, opposite sides of the top plate 120 are respectively provided with the linear movement device, and the pressing rod coupled to the linear movement device may move in the horizontal direction. The pressing rod may press one of opposite ends of the top plate 120 while moving forwards. At this time, the pressing rod may press and move the top plate 120 leftwards or rightwards so as to change the Y-axis of the ingot 10. Here, after separating the fixing and releasing unit 130 from the top plate 120, which is fixed to the bottom plate 110, the top plate 120 may be moved using the linear movement device. Y-axis compensation of the ingot 10 may be performed by moving the top plate 120 using the linear movement device so as to tilt the ingot 10 as illustrated in FIG. 6. When the Y-axis adjustment of the top plate 120 is completed, the top plate 120 may be fixed to the bottom plate 110 again using the fixing and releasing unit 130.

Meanwhile, an interference-preventing groove 112 may be formed in the upper portion of the bottom plate 110 along the movement trajectory of the linear movement device so that the pressing portion of the linear movement device, which is the pressing rod, does not come into contact with the bottom plate 110 when one of the opposite ends of the top plate 120 is pressed by the linear movement device.

In addition, a handle 140 may be additionally provided on the bottom plate 110 or on the top plate 120 so as to enable an operator to easily grip the workplate 100. Here, when the handle 140 is provided on the top plate 120, the interference-preventing groove 112 may be formed in the upper portion of the handle 140.

Figure 7:
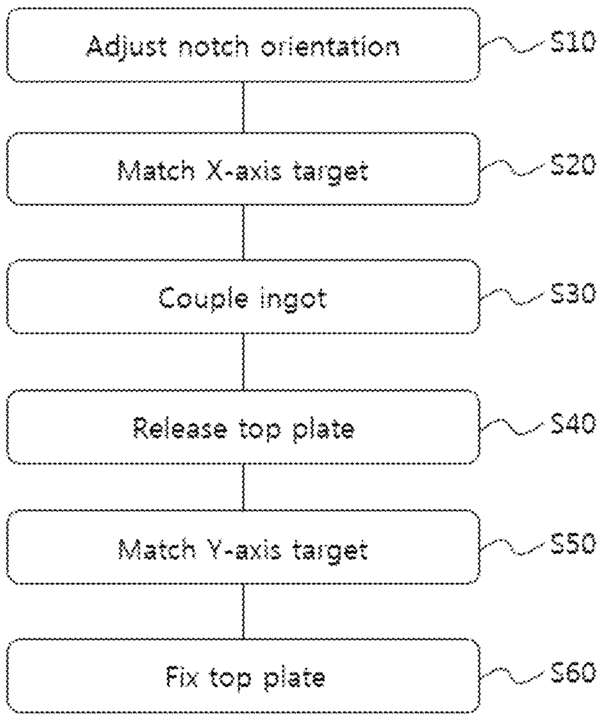
FIG. 7 is a flowchart according to an embodiment of a Y-axis compensation method of an ingot.
Figure 8:
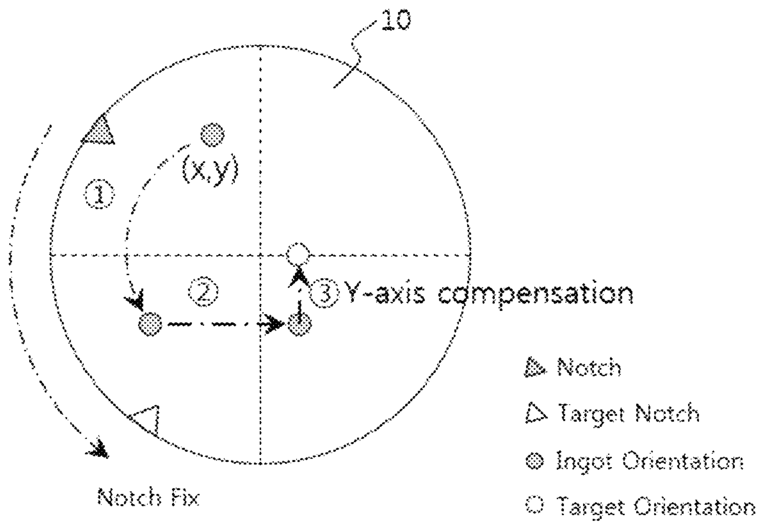
FIG. 8 is a conceptual view illustrating a method of compensating ingot orientation using the workplate for Y-axis compensation of an ingot of the present invention.

FIG. 7 is a flowchart according to an embodiment of a Y-axis compensation method of an ingot, and FIG. 8 is a conceptual view illustrating a method of compensating ingot orientation using the workplate for Y-axis compensation of an ingot of the present invention.

Reference numerals are based on FIGS. 2 to 5, and a Y-axis compensation method of an ingot according to the present invention will be described as follows with reference to FIGS. 7 and 8.

The Y-axis compensation method of the ingot using the workplate for Y-axis compensation of the ingot of the present invention may include matching an X-axis target in step S20, coupling the ingot in step S30, and matching a Y-axis target in step S50. Here, the method may further include releasing the top plate in step S40 and fixing the top plate in step S60. In addition, the method may further include adjusting a notch orientation in step S10.

Operation in each step may refer to the description of the workplate for Y-axis compensation of the ingot, and for convenience, it will be briefly described in the order shown in FIG. 7.

In the adjusting the notch orientation in step S10, the notch orientation may be fixed to a desired orientation or a set orientation. In other words, in the present invention, the notch orientation is fixed to one set orientation, instead of rotating the ingot 10 so as to change a Y value (vertical) to '0' and then moving the ingot 10 to the left or right so as to change an X value (horizontal) to match a target, as in the related art.

In the matching the X-axis target in step S20, the ingot 10 is moved to the left and right on the upper side of the top plate 120 so as to adjust the X-axis of the ingot 10 to match the X value (horizontal) target.

In the coupling the ingot in step S30, the ingot 10 with the adjusted X-axis may be attached to the upper portion of the top plate 120. In other words, the ingot 10 is attached to the top plate 120 in the state in which the X-axis of the ingot 10 is adjusted to match the target.

In the releasing the top plate in step S40, the state in which the top plate 120 is fixed to the bottom plate 110 may be released using the fixing and releasing unit 130 provided at the top plate 120 and the bottom plate 110. In this state, the top plate 120 is movable along the curved upper surface of the bottom plate 110.

In the matching the Y-axis target in step S50, the top plate 120 may be moved along the curved upper surface of the bottom plate 110 so as to match the Y value (vertical) target. Since the top plate 120 moves only in the left and right directions (refer to the left-right direction in FIGS. 4 and 5), only the Y-axis value is adjusted, while the X-axis of the ingot 10, which is coupled to the top plate 120, is fixed at the X value, and accordingly, the Y-axis of the ingot 10 may be compensated to match the target value.

In the fixing the top plate in step S60, the Y-axis angle is adjusted to the target value, and then the top plate 120 may be fixed to the bottom plate 110 using the fixing and releasing unit 130. In other words, the position of the top plate 120 on the upper portion of the bottom plate 110 is fixed.

Although not illustrated, after the fixing the top plate in step S60, the workplate 100 may be moved to an ingot-cutting apparatus so as to cut the ingot.

With the workplate for Y-axis compensation of an ingot described above, the position of the notch angle may be fixed, and the Y-axis of the ingot orientation may be controlled, which is not possible when using the conventional method.

According to the workplate for Y-axis compensation of the ingot and the Y-axis compensation method of the ingot using the same, that is, the present invention described above, the position of the notch angle may be fixed, and the Y-axis of the ingot orientation may be controlled, which is not possible when using the conventional method.

Features, structures, effects, etc. described in the embodiments above are included in at least one embodiment of the present invention, and are not necessarily limited to only one embodiment. Further, the features, structures, effects, etc. illustrated in each embodiment may be combined or modified to form other embodiments by those skilled in the art to which the embodiments pertain. Therefore, content related to such combinations and modifications should be construed as being included in the scope of the present invention.

What is claimed is:

1. A workplate for Y-axis compensation of an ingot, the ingot attached thereto at a cutting-plane angle so as to be cut using a wire-cutting apparatus, the workplate comprising:

a bottom plate having an upper surface formed to be curved downwards with respect to a longitudinal direction of the ingot attached to the workplate; and a top plate, coupled to the bottom plate such that a lower surface thereof is movable along the upper surface of the bottom plate and configured to enable the ingot to be coupled to an upper portion thereof at an X-axis cutting-plane angle, wherein the bottom plate is formed, at an upper portion thereof, with a movement guide configured to guide the top plate to move along the curved upper surface of the bottom plate in a longitudinal direction of the bottom plate without being separated from the bottom plate, wherein the movement guide is formed to be narrower in width than the upper surface of the bottom plate, and protrudes upwards with respect to the longitudinal direction of the ingot attached to the workplace; and the movement guide has opposite side surfaces inclined from inside to outside, wherein the top plate, which moves along the curved upper surface of the bottom plate while contacting the same, is formed with bent portions in opposite side surfaces thereof, respectively;

lower surfaces of the bent portions have a shape corresponding to a shape of the curved upper surface of the bottom plate; and inner side surfaces of the bent portions are formed to be inclined from outside to inside while extending downwards such that the inner side surfaces form a shape corresponding to a shape of the opposite side surfaces of the movement guide, and wherein the top plate is moved by an operation of a linear movement device configured to press each of longitudinal opposite ends of the top plate in a horizontal direction; and an interference preventing groove is formed in the upper portion of the bottom plate along a movement trajectory of the linear movement device so that a pressing portion of the linear movement device does not come into contact with the bottom plate when one of the opposite ends of the top plate is pressed by the linear movement device.

2. The workplate according to claim 1, wherein the top plate is formed, at a lower portion thereof, with a movement guide coupler coupled to the movement guide so as to allow the top plate to move along the movement guide.

3. The workplate according to claim 1, further comprising:

a fixing and releasing unit configured to fix the top plate to the bottom plate or to release fixation between the top plate and the bottom plate.

4. The workplate according to claim 3, wherein the fixing and releasing unit comprises:

a plurality of fastening holes formed in a side surface of the top plate; and fixing bolts respectively fastened to the fastening holes so as to press an upper side surface of the bottom plate, thereby fixing the top plate to the bottom plate.

5. The workplate according to claim 1, wherein the ingot is coupled to the top plate in a state in which a notch orientation of the ingot is fixed to one orientation.

* * * * *